Figure 1:
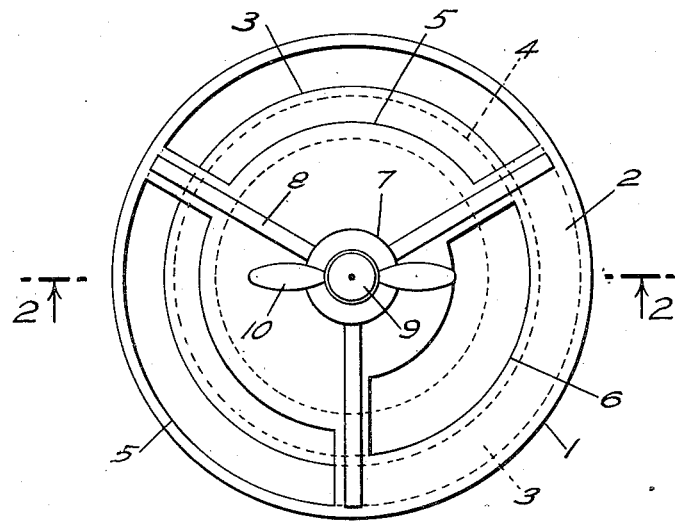

Dec. 13, 1949     W. E. ZINGSHEIM     2,491,148

ANVIL-DIE AND JIG FOR HOLES IN SHEET METAL

Filed Oct. 9, 1948

INVENTOR
WILLIAM E. ZINGSHEIM
BY
G. F. McDougall
ATTORNEY

Patented Dec. 13, 1949

2,491,148

UNITED STATES PATENT OFFICE 2,491,148

ANVIL-DIE AND JIG FOR HOLES IN SHEET METAL

William E. Zingsheim, Portland, Oreg.

Application October 9, 1948, Serial No. 53,677

3 Claims. (Cl. 164—85)

This invention relates to a sheet metal cutting apparatus. More specifically it discloses a combined die and anvil, with a jig, to be employed in cutting a hole through sheet metal, especially when the sheet metal is already mounted in place and cannot be conveniently dismounted to receive machine work.

The device is very useful in the tool kit of an electrician, meaning the electrical worker that installs wiring, especially where, as in first class work, the wires are carried in conduits and outlet boxes and cabinets are of sheet metal. Outlet boxes and cabinets customarily are manufactured with "knock-outs" of different sizes and arrangements within which the conduits end, which will often be found to be wrongly placed or sized, requiring others.

Changes of plan during construction, or addition of new wiring to handle new installations in and through previously installed cabinets, are a common thing and only one who has tried it can realize the extreme difficulty of cutting a hole in thin sheet metal, large enough to take the end of a 1½" to a 3" conduit (1¾" to 3½" dia.) without great distortion of the cabinet.

It is the object of this invention to provide a simple, low cost and highly effective tool that provides a combined die and anvil, a jig that clamps to the first mentioned tool with the sheet metal therebetween (from which the tool derives support), and at the same time provide a guide for the workman's cold chisel that will remove a disc of metal to make a new hole; or cut out an annulus if a hole is to be enlarged, without causing any distortion of the sheet metal surface being penetrated quickly and certainly by a skilled workman who knows the tool.

A drawing accompanies this specification and shows, somewhat schematically as will be pointed out, what I, at this time, regard as the best form of the invention.

Figure 2:
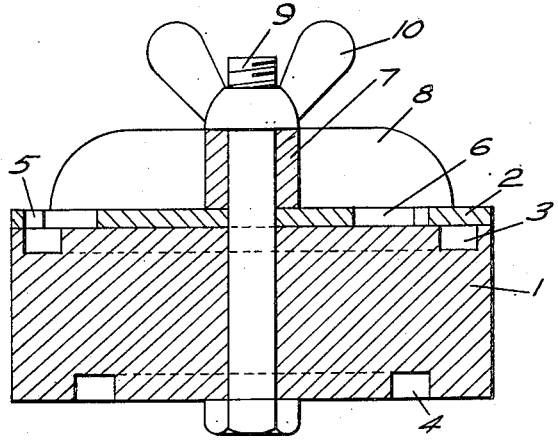
Figure 3:
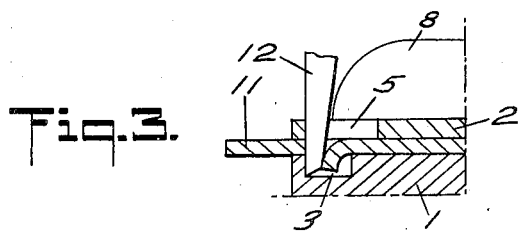

In the drawing:

Fig. 1 is a plan view of the tool as it will appear, lying, for example, in the workman's tool box;

Fig. 2 is a section of the structure shown in Fig. 1, taken on the plane 2—2 of Fig. 1; and Fig. 3 is a fragmentary view of a small portion of the tool, engaged to a plate 11, to be cut, and with a chisel point 12, which has just made a cut.

Describing the drawing figures in greater detail: Numeral 1 represents a combined die and anvil, having a machined groove 3, on its presently uppermost surface and another groove of smaller diameter 4, machined into its under surface. These grooves will be complete and uninterrupted. Modification of the tool may include two or more grooves on any one surface, as desired.

A jig 2, is formed as a circular plate, having a central hub 7, and a plurality of ribs 8, rigid with the plate. Both the jig 2 and the anvil 1, are preferably provided with central drilled holes, within which a bolt 9, with a wing nut 10, may be placed to screw-clamp the two parts on opposite sides of a plate to be cut, such as 11.

The jig 2, is shown as provided with segments of annular through slots such as 5 and 6, through which a chisel may be placed in cutting position against a plate, such as 11, and the chisel 12, driven through.

The workman may exercise his own choice of chisel point, but I prefer a chisel about one-eighth of an inch wide beveled in both directions, so that a sharp hammer blow will drive it clear through a steel plate as heavy as sixteen gage.

The anvil will be centered, either by a hole that fits the bolt 9, or in case of an enlarged hole being required, the anvil 1 may be made to register with a scratched circle representing the new hole, the jig clamped in place as before and the chisel will cut the whole arcuate length of one of the slots such as 5, whereupon the wing nut may be slacked and the jig suitably rotated for further cutting.

In case a previous hole is being enlarged, say to change it from a hole for a 2" conduit to one for a 3" conduit, cutting will be done without moving the jig, until there are enough of the downwardly bent tongues of metal, such as the one shown in Fig. 3, to definitely place the anvil. Then the jig 2 may be moved to cut remaining uncut metal to complete the hole. It is not thought that any hardening of the metal of the grooved anvil portion will be required.

The arrangement of the slots such as 5, is schematic. One anvil with two or more jigs is contemplated but in any event, the best work will be done when the grooves are set in good registry with the through slots, so that the point of the chisel 12 has a fair shearing cut.

Variations in placement of the grooves or construction of the jig may be made to suit individual opinions or as the use of the device indicates their desirability, without departing from the principles of the tool as described and illustrated.

Having fully disclosed my invention so that those familiar with the arts involved, tool making and electrical installation, will be able to make and use it, what I claim as new and desire to secure by Letters Patent is:

1. A holder for sheet metal, preparatory to chiseling a hole therethrough, comprising a relatively heavy anvil portion, a jig portion and means for clamping the said anvil on one side of a plate to be cut and the jig, in registry with the anvil on the other side of said plate, characterized by the said anvil portion being formed with a machined face, a machined groove in said face, the perimeter of the groove being of the same size as a desired hole and the said jig portion being provided with a plurality of slots, the outer perimeter of which will be in registry with the said groove, for a chisel guide when the jig and anvil are clamped together.

2. A combined jig and anvil for guiding a chisel and supporting a sheet metal plate to cut a hole in the plate, comprising a relatively heavy metal anvil portion of generally circular outline machine faced normal to its axis, a machined groove in said face, the outer perimeter of which is normal to the face, a cooperating jig member clampable to said face, an arcuate slot through a portion of said jig that registers with a portion of a groove to provide a chisel guide when the said jig and anvil are clamped together.

3. A cutter guide and anvil support for altering sheet metal devices by chiseling a clean hole through said sheet metal, comprising a relatively heavy, faced anvil portion, a circular groove machined squarely into said face with its perimeter normal to said face, a faced plate jig having an arcuate slot of the same radial center as the groove, means for clamping the jig in registry with a sheet metal therebetween, to be cut, whereby the perimeter of the groove serves as a shear edge and the perimeter of the slot serves to guide a chisel.

WILLIAM E. ZINGSHEIM.

No references cited.